US012138748B2

(12) United States Patent
Adibi

(10) Patent No.: US 12,138,748 B2
(45) Date of Patent: Nov. 12, 2024

(54) RATCHET MECHANISM AND RATCHET PAWL

(71) Applicant: MATCO TOOLS CORPORATION, Stow, OH (US)

(72) Inventor: Darius S. Adibi, Lyndhurst, OH (US)

(73) Assignee: MATCO TOOLS CORPORATION, Stow, OH (US)

(*) Notice: Subject to any disclaimer, the term of this patent is extended or adjusted under 35 U.S.C. 154(b) by 90 days.

(21) Appl. No.: 17/557,217

(22) Filed: Dec. 21, 2021

(65) Prior Publication Data

US 2023/0191563 A1 Jun. 22, 2023

(51) Int. Cl.
*B25B 13/46* (2006.01)

(52) U.S. Cl.
CPC .................................. *B25B 13/463* (2013.01)

(58) Field of Classification Search
CPC .... B25B 13/461; B25B 13/462; B25B 13/463
USPC ............................... 81/60, 61, 62, 63.1, 63.2
See application file for complete search history.

(56) References Cited

U.S. PATENT DOCUMENTS 915,446 A 3/1909 Kearnes
2,725,772 A 12/1955 Stone
2,957,377 A * 10/1960 Hare .................... B25B 13/463 81/63
2,963,929 A 12/1960 Barnes
3,019,682 A 2/1962 Hare
3,269,496 A 8/1966 Kilness
3,342,229 A 9/1967 Janes
3,369,416 A 2/1968 Kilness
5,000,066 A 3/1991 Gentiluomo
5,533,427 A 7/1996 Chow
5,636,557 A 6/1997 Ma
5,857,390 A 1/1999 Whiteford
6,134,990 A 10/2000 Ling et al.
6,134,991 A 10/2000 Chaconas
6,230,591 B1 5/2001 Ling et al.
6,601,477 B2 8/2003 Huang
6,629,477 B2 10/2003 Ling et al.
6,666,112 B2 * 12/2003 Hu ........................ B25B 13/463 81/63.1
6,711,973 B2 * 3/2004 Arnold ................ B25B 23/0035 81/63
6,722,234 B2 * 4/2004 Hu ........................ B25B 13/463 192/43.2
6,732,614 B2 * 5/2004 Hu ........................ B25B 13/463 81/60

(Continued)

*Primary Examiner* — Eric J Rosen
*Assistant Examiner* — Jason Khalil Hawkins
(74) *Attorney, Agent, or Firm* — Hahn Loeser & Parks LLP

(57) ABSTRACT

The present disclosure relates to a ratchet and, specifically, a ratchet head arrangement, or assembly, for a ratchet. The ratchet head arrangement, or assembly, of the present disclosure is directed to the features of a ratchet pawl that balance and transfer the loads and stresses on the internal components of ratchet head mechanism across the components of the assembly to avoid premature failure, or fracture, or avoid isolated point loads on the internal components. Specifically, a ratchet pawl of the present disclosure includes a recessed area dividing sets of teeth for engaging teeth of a ratchet gear in combination with opposing substantially flat stop walls that fully mate with the sidewalls of the interior housing of a ratchet head.

17 Claims, 9 Drawing Sheets

(56) References Cited

U.S. PATENT DOCUMENTS

| | | | | |
|---|---|---|---|---|
| 6,758,641 | B2 | 7/2004 | Hu | |
| 6,868,759 | B2 | 3/2005 | Tuan-Mu | |
| 6,918,323 | B2 * | 7/2005 | Arnold | B25B 13/463 81/63 |
| 6,918,477 | B2 | 7/2005 | Tuanmu | |
| 6,971,287 | B2 | 12/2005 | Lee et al. | |
| 6,988,429 | B2 | 1/2006 | Lee et al. | |
| 7,059,219 | B2 | 6/2006 | Arnold et al. | |
| 7,073,412 | B1 | 7/2006 | Arnold | |
| 7,131,353 | B2 | 11/2006 | Arnold et al. | |
| 7,185,566 | B2 | 3/2007 | Arnold et al. | |
| 7,207,244 | B2 | 4/2007 | Chen | |
| 7,231,851 | B2 | 6/2007 | Tuan-Mu | |
| 7,263,918 | B1 * | 9/2007 | Chen | B25B 13/463 81/63.1 |
| 7,263,919 | B2 | 9/2007 | Arnold | |
| 7,311,019 | B2 | 12/2007 | Arnold et al. | |
| D559,054 | S | 1/2008 | Tuan Mu | |
| 7,353,735 | B2 | 4/2008 | Patel et al. | |
| 7,861,620 | B2 | 1/2011 | Arnold et al. | |
| 7,895,921 | B2 * | 3/2011 | Huang | B25B 13/463 81/63.1 |
| 8,056,447 | B2 | 11/2011 | Arnold et al. | |
| 8,474,351 | B2 | 7/2013 | Arnold et al. | |
| 8,485,069 | B1 * | 7/2013 | Chen | B25B 13/463 81/62 |
| 8,555,751 | B1 | 10/2013 | Chern | |
| 8,833,208 | B2 | 9/2014 | Arnold et al. | |
| 9,067,308 | B2 | 6/2015 | Lai | |
| 9,079,299 | B2 * | 7/2015 | Wu | B25B 13/463 |
| 9,089,953 | B2 * | 7/2015 | Heidel | B25B 13/463 |
| 9,132,532 | B2 | 9/2015 | Arnold et al. | |
| 9,815,179 | B2 | 11/2017 | Anderson et al. | |
| 10,464,191 | B2 | 11/2019 | Anderson et al. | |
| 10,513,014 | B2 | 12/2019 | Anderson et al. | |
| 2007/0277652 | A1 | 12/2007 | Tuan-Mu | |
| 2013/0228049 | A1 | 9/2013 | Shen | |
| 2020/0094384 | A1 | 3/2020 | Anderson et al. | |
| 2021/0031336 | A1 | 2/2021 | Anderson | |

* cited by examiner

RATCHET MECHANISM AND RATCHET PAWL

BACKGROUND

This disclosure relates generally to ratchets and, more specifically, to a ratchet mechanism and pawl associated with a ratchet mechanism for reducing stress on the internal components of the ratchet mechanism to lengthen its useful life.

A ratchet typically embodies a handle portion and a head portion. The head portion houses a ratchet mechanism capable of rotating about an axis. A ratchet may be manually operated.

A ratchet drive may be positioned within the head portion of the ratchet and include a drive body onto which a socket may engage or attach. The drive body may be a square drive or formed of any geometric configuration for receiving or engaging the socket. The ratchet drive may further include a gear capable of reciprocating within the head portion in response to the manual driven operation of the ratchet. The drive body is formed on or attached to the gear. The gear may have outwardly facing gear cogs, teeth, serrations, or other engagement portion, herein referred to generally as gear teeth.

The ratchet mechanism often comprises a pawl. The pawl is positioned within the head and is capable of engaging the gear teeth and driving the gear. The pawl may be forced into engagement with the gear teeth by way of a pusher and spring. The pusher and spring may be driven to and from the pawl by way of a lever. By adjusting the engagement of the pusher upon the pawl, by way of the lever, the pawl may change its position of engagement on the gear teeth, thereby, changing the driving direction, or travel, of the gear and the drive body.

Ratchets are relied on to provide a significant amount of torque through the drive body when in operation. The stresses imposed on the ratchet in such conditions translate to the ratchet mechanism. Specifically, the stresses imposed on the ratchet translate between the gear teeth, teeth of the pawl, and through the pawl, often resulting in premature wear, failure, or fracture of those internal components. Specifically, such failures may be attributed to isolated stress failures, or fractures, or point loads of the components of the ratchet mechanism. What is needed is a ratchet that better protects the components of the ratchet mechanism and pawl design that reduces the internal stresses within the ratchet mechanism. It would also be desirable to maintain the functionality of the ratchet mechanism, and that strengthens the engagement between the ratchet pawl and the gear teeth while decreasing isolated stresses on the ratchet pawl and/or the gear teeth that otherwise result in failures, or degradation such as fractures.

SUMMARY

The present disclosure sets forth a ratchet head assembly and, more specifically, a configuration and arrangement of the components of a ratchet head assembly to reduce stresses on the components. In an example, a ratchet head comprises a ratchet gear engaged with a ratchet pawl. Gear teeth of the ratchet gear fully engage a first set of teeth of the ratchet pawl simultaneously with a substantially flat first sidewall of the ratchet pawl fully contacting a first flat interior sidewall of the housing. A second set of teeth of the ratchet pawl are separated from the first set of teeth of the ratchet pawl by a recessed area. The second set of teeth of the ratchet pawl are fully disengaged from the ratchet gear when the first set of teeth are engaged with the gear teeth. Additionally, a substantially flat second sidewall of the ratchet pawl is fully disconnected from a second flat interior sidewall of the housing also while the substantially flat first sidewall of the ratchet pawl fully contacts the first flat interior sidewall of the housing. In examples, the substantially flat first sidewall may be at an acute angle relative the substantially flat second sidewall. Additionally, or alternatively, the first flat interior sidewall of the housing may be at an acute angle relative the second flat interior sidewall of the housing. Comparatively, an angle between the substantially flat first sidewall and the substantially flat second sidewall is less than an angle between the first flat interior sidewall of the housing and the second flat interior sidewall of the housing. In some examples, the angle between the substantially flat first sidewall and the substantially flat second sidewall is within 10 to 20 degrees of the angle between the first flat interior sidewall of the housing and the second flat interior sidewall of the housing.

In operation, the position of the ratchet pawl within the housing is configured to change within the housing and relative to the gear teeth by way of a lever extending into the housing. The movement of the lever may be limited by the engagement of the substantially flat first sidewall of the ratchet pawl with the first flat interior sidewall of the housing.

In examples, the first set of teeth and the second set of teeth of the ratchet pawl extend across respective concave surfaces. The concave surface of the first set of teeth and the concave surface of the second set of teeth may be on different arcs. The recessed area may additionally be concave and, thereby, forms a third arc between the concave surfaces of the first set of teeth and the concave surface of the second set of teeth. The recessed area extends further into the ratchet pawl than teeth of the first set of teeth and the second set of teeth. The recessed area never engages the gear teeth. The concave surface of the first set of teeth and the concave surface of the second set of teeth may have the same radius, regardless of arc. Moreover, the concave surface of the first set of teeth, the concave surface of the second set of teeth, and a convex surface of the gear teeth are positioned on have the same radius.

The arrangement disclosed herein transfers the rotational stress on the ratchet gear from the gear teeth to the first flat interior sidewall by way of the ratchet pawl from each tooth of the first set of teeth through an entire length of the substantially flat first sidewall. Yet, the ratchet pawl remains free to transfer between the first flat interior sidewall of the housing and the second flat interior sidewall of the housing while additionally rotating within the housing when transferring or changing direction of operation of the ratchet.

Additional examples exemplify that the mating sidewalls need not be flat sidewalls. Instead, mating sidewalls may simply be mating configurations with full contact between the mating configurations (whether a curvature, teeth, or the like). In examples, a ratchet head comprises a recessed housing comprising a ratchet gear engaged with a ratchet pawl therein. The ratchet gear has gear teeth about a perimeter and a drive body for engaging and rotating a workpiece. The ratchet pawl has a concave face for engaging the ratchet gear where the concave face comprises a first set of teeth and a second set of teeth separated by a recessed area. The ratchet pawl additionally comprises a first sidewall and a second sidewall extending from the first set of teeth and the second set of teeth, respectively, in a direction away from the ratchet gear. An entire length, or surface, of the first sidewall of the ratchet pawl engages a first exterior sidewall of the recessed housing as all teeth of the first set of teeth fully engage the gear teeth. The recessed area may be centrally positioned on, and recessed into, a front face of the ratchet pawl and the first set of teeth and the second set of teeth are additionally positioned on the front face of the ratchet pawl.

As mentioned above, the first sidewall and the second sidewall may be substantially flat. They may be alternative geometries as well. Importantly, and regardless of their geometries, the first sidewall of the ratchet pawl and the first exterior sidewall of the recessed housing are to be opposing mating surfaces that mate, fully contact one another, or are in full engagement with one another. Likewise, the second sidewall of the ratchet pawl and the second exterior sidewall of the recessed housing are to be opposing mating surfaces that mate, fully contact one another, or are in full engagement with one another. This engagement is to occur simultaneously as all teeth of the respective first set of teeth or second set of teeth fully engage the gear teeth.

The foregoing and other objects, features, and advantages of the examples will be apparent from the following more detailed descriptions of particular examples as illustrated in the accompanying drawings wherein like reference numbers represent like parts of the examples.

BRIEF DESCRIPTION OF THE DRAWINGS

Reference is made to the accompanying drawings in which particular examples and further benefits of the examples are illustrated as described in more detail in the description below, in which.

DETAILED DESCRIPTION

The present disclosure relates to a ratchet and, specifically, a ratchet head arrangement, or assembly, for a ratchet. The ratchet head arrangement, or assembly, of the present disclosure is directed to the features of a ratchet pawl that are relied on to balance and transfer the stresses exhibited on the internal components of ratchet head across arrangement, or components, of the assembly to avoid premature failure, or fracture, or isolated point loads on the internal components.

Figure 1:
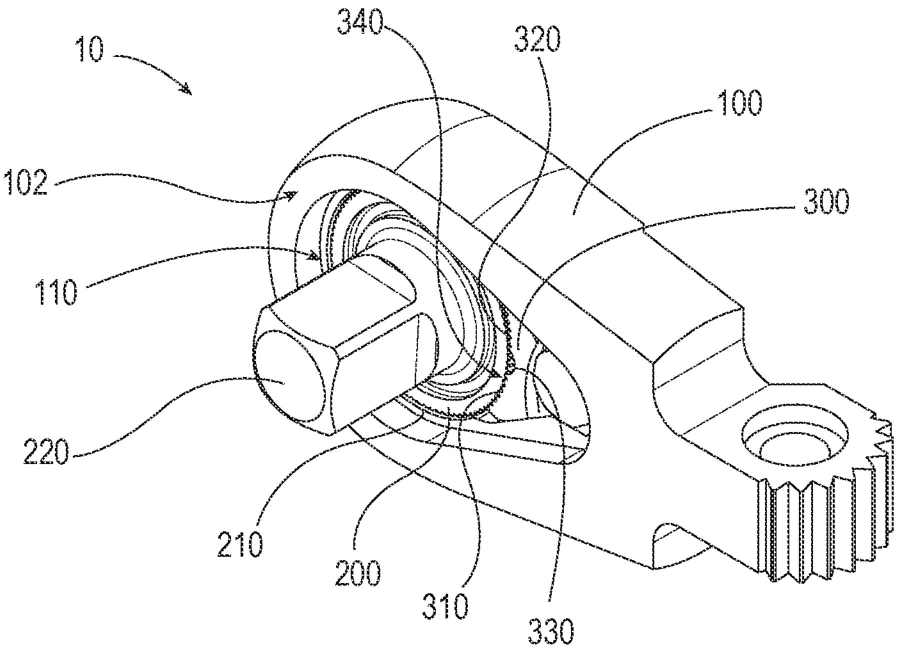
FIG. 1 is a bottom side perspective view of a ratchet head assembly with the recessed housing of the ratchet head visible, in accordance with an example of the disclosure.

FIG. 1 illustrates a ratchet head assembly 10. The ratchet head 100 comprises a recessed housing 110 open to a bottom side 102 of the ratchet head 100. Within the recessed housing 110 is a ratchet gear 200 engaged with a ratchet pawl 300. The ratchet gear 200 has teeth 210 extending about the perimeter, or circumference, of the ratchet gear 200. The ratchet gear 200 rotates within the recessed housing 110. A drive body 220 extends from the ratchet gear 200 for engaging and driving a workpiece (e.g., nut, bolt, head, or the like). The ratchet head assembly 10 of FIG. 1 is illustrated without a protective cover which would otherwise enclose or seal the recessed housing from the bottom side 102. The drive body would further extend through the protective cover (not shown).

Still referring to FIG. 1, the ratchet pawl 300 has two sets of teeth, a first set of teeth 310 and a second set of teeth 320. The first set of teeth 310 are separated from the second set of teeth 320 on the ratchet pawl 300 by a recessed area 330. The first set of teeth 310 and the second set of teeth 320 are on a front face 340 of the ratchet pawl 300. The recessed area 330 may be a concave or other configuration of recess within the front face 340 of the ratchet pawl 300. The recessed area 330 separates the first set of teeth 310 and the second set of teeth 320. The recessed area 330 serves several purposes. First, the recessed area 330 creates a void between first set of teeth 310 and the second set of teeth 320 which otherwise engage the teeth 210 of the ratchet gear 200 to impart forces on the ratchet gear 200 in opposing directions, when in operation. Second, the recessed area 330 creates a void where the teeth 210 of the ratchet gear 200 will not otherwise engage the pawl at a location between the first set of teeth 310 and the second set of teeth 320. This prevents unnecessary binding between the opposing teeth 310, 320 of the ratchet pawl 300 and the teeth 210 of the ratchet gear 200 that would otherwise engage, or partially, engage at this location if the recessed area 330 were not present. The void created by the recessed area 330 is greater than the depth and is generally greater in width than a tooth of the teeth of the first set of teeth 310 and/or the second set of teeth 320 and is generally centrally located on the front face 340 of the pawl 300.

Figure 3:
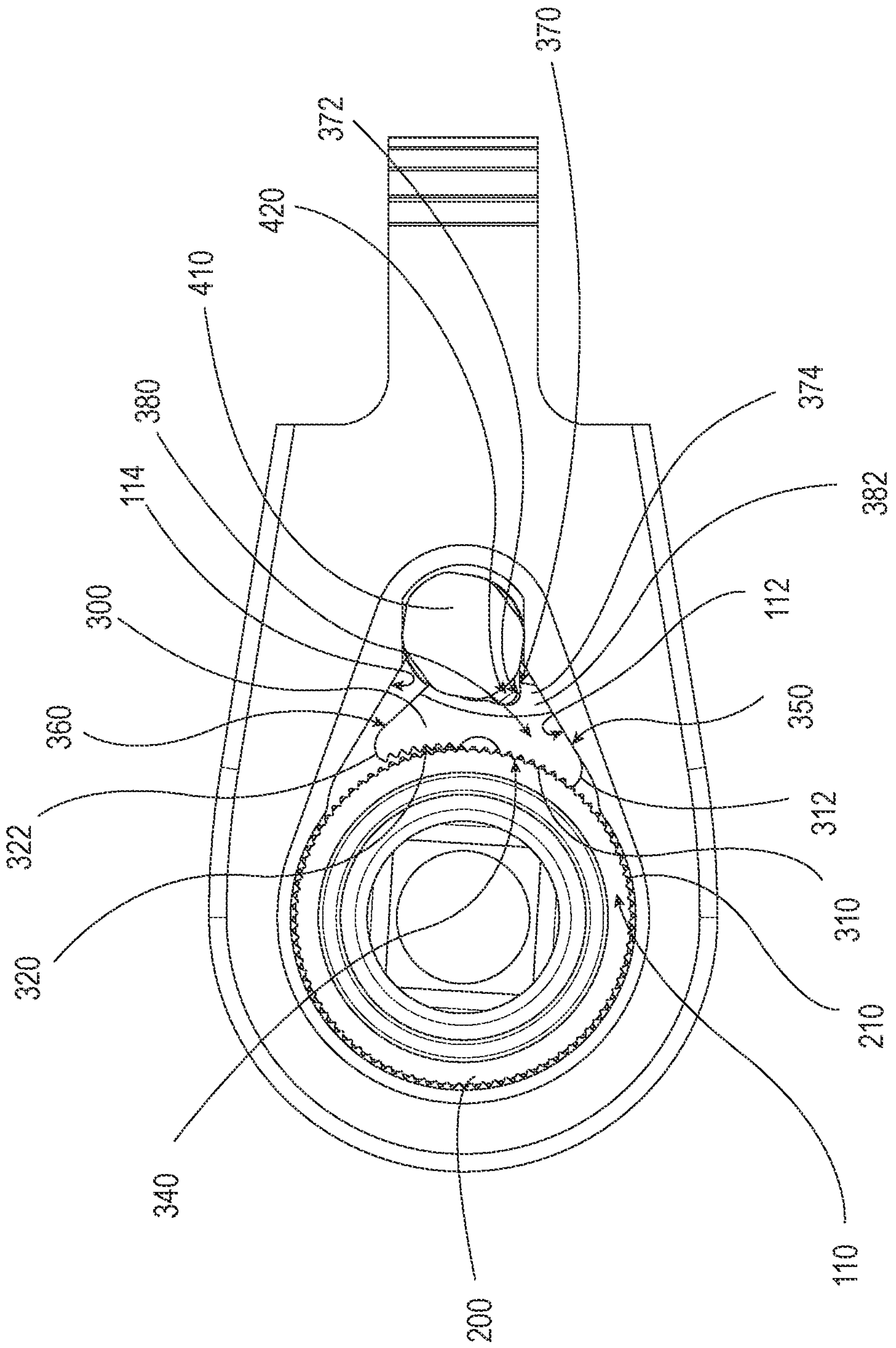
FIG. 3 is a bottom side view of a ratchet head assembly with the recessed housing of the ratchet head visible and with a lever present, in accordance with an example of the disclosure.
Figure 4:
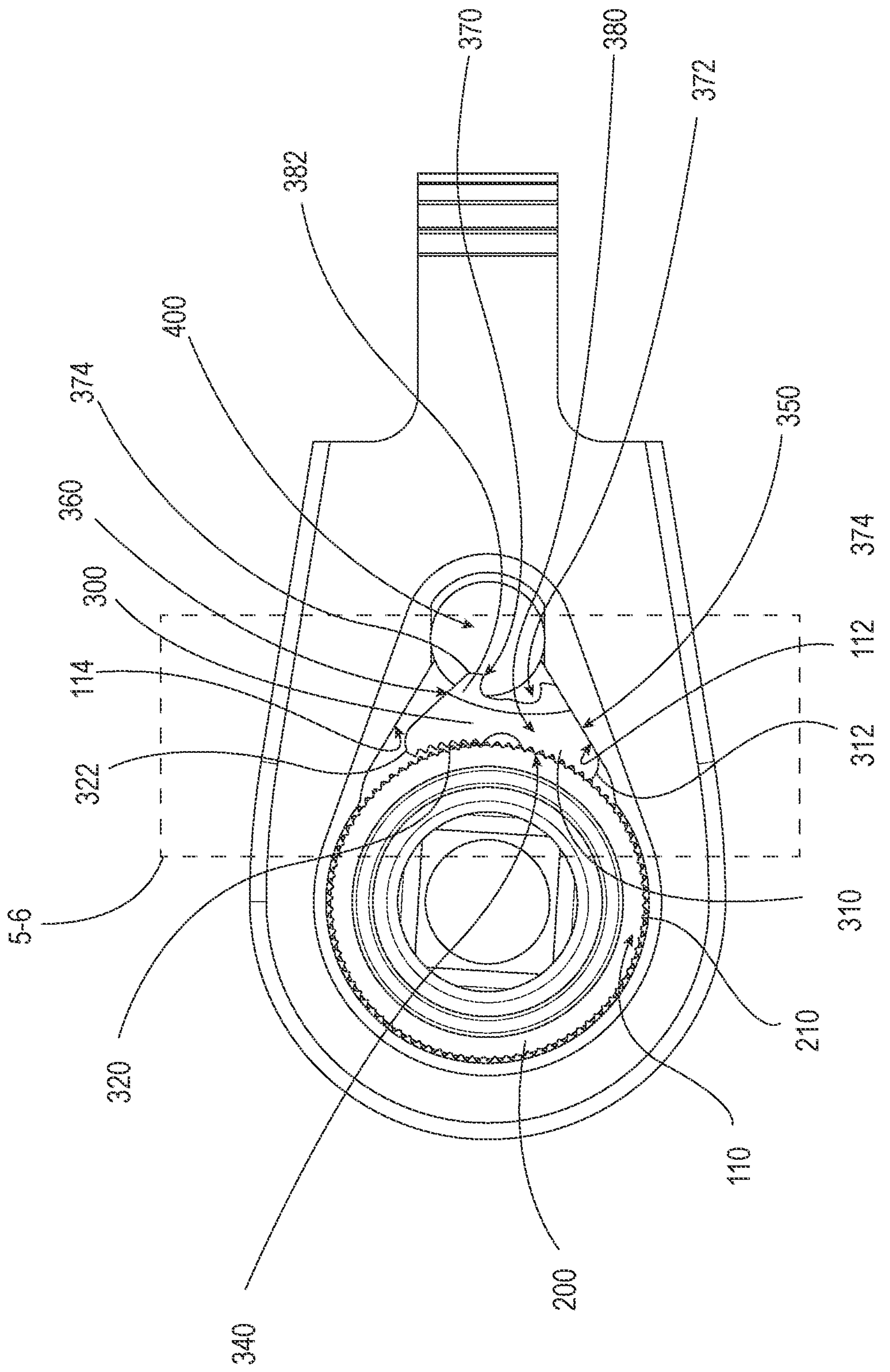
FIG. 4 is a bottom side view of a ratchet head assembly with the recessed housing of the ratchet head visible and without a lever present, in accordance with an example of the disclosure.

As best illustrated by FIGS. 3-4, the first set of teeth 310 and the second set of teeth 320 of the ratchet pawl 300 each transition to opposing stop walls 350, 360 from the front face 340. The transition may be a radiused corner 312, 322 extending for the outermost respective tooth of the first set of teeth 310 and the second set of teeth 320. The respective first stop wall 350 and second stop wall 360 of the ratchet pawl 300 are substantially flat. As used in this context, substantially flat means flat aside from the transition to adjacent surfaces, or sidewalls, such as, for example, the radiused corner 312, 322 transitions.

Figure 2:
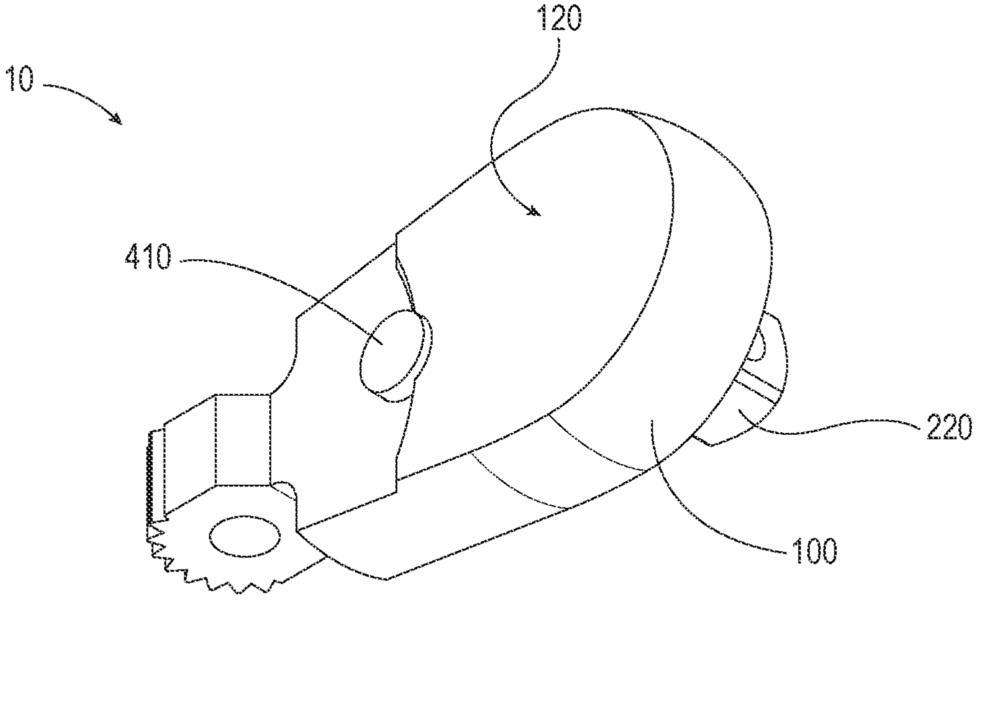
FIG. 2 is a top side perspective view of a ratchet head assembly, in accordance with an example of the disclosure.

The only difference between FIG. 3 and FIG. 4 is that FIG. 3 illustrates a lever 410 positioned within a lever bore 400 (as illustrated by FIG. 4) with a corresponding pusher 420 (as illustrated by FIG. 3). The lever 410 extends through a top side 120 (as illustrated by FIG. 2) of the ratchet head 100. The combination of the lever 410, the pusher 420, and the ratchet pawl 300 operate as an activator that engages/changes the direction of the ratchet pawl 300 and, thereby, the driving direction of the ratchet gear 200 within an enclosed recessed housing 110 (enclosed by way of a protective cover (not shown)). The lever 410 may operate by pushing, turning, pulling, flipping, or the like, and as known by one of ordinary skill in the art.

Referring to FIG. 3, the pusher 420 may operate between the lever 410 and the ratchet pawl 300 by way of a spring. The pusher 420 and the spring are movably connected to the lever 410 and the ratchet pawl 300 such that the pusher 420 and the spring are positioned between the lever 410 and the pawl 300 within the recessed housing 110. In one particular example, the pusher 420 and the spring are positioned between the lever 410 and the ratchet pawl 300 and are in compression between the lever 410 and the ratchet pawl 300. In one variation, the pusher 420 is in contact with the ratchet pawl 300 and the spring is in contact with the lever 410 and the pusher 420. It should be recognized that the pusher 420 may be in contact with the lever 410 and/or the spring may be in contact with the ratchet pawl 300 without departing from the present disclosure. Likewise, it is also appreciated the spring may be integral to the pusher 420 wherein the pusher (or multiple pushers separated by a spring) may be in contact with both the ratchet pawl 300 and the lever 410. In other examples, a spring may be utilized without a pusher 420, or serve as the pusher. In operation, the pusher 420 moves from a position proximal to the first stop wall 350 of the ratchet pawl 300 to a position proximal to the second stop wall 360 of the ratchet pawl, as forced by the movement or rotation of the lever 410. A seating portion 382 (i.e., a groove, shelf, etc.) may be formed, or recessed, on the bottom side 380 of the ratchet pawl to the back face 370 of the ratchet pawl 300 such that the lever 410 overlaps the ratchet pawl 300 at the seating portion 382. The ratchet pawl 300 may further comprise a recess 372 at the back face 370 for receiving the pusher 420 and for movement of the pusher 420, therein, such that the pusher moves and/or slides in the within recess 372 of the back face 370. Additionally, the back face 370 may include ledges 374, or the like, positioned at one or more of the stop walls 350, 360 of the ratchet pawl 300 to prevent the pusher 420 from disengaging the ratchet pawl 300.

Turning now to FIGS. 3 and 4, the engagement of the first stop wall 350 and the second stop wall 360 of the ratchet pawl 300 with the respective sidewalls 112, 114 of the recessed housing 110 limit the movement of the ratchet pawl 300 within the recessed housing 110. This additionally serves to limit the movement of the lever 410 and pusher 420 (and corresponding spring, as applicable). The sidewalls 112, 114 of the recessed housing are additionally flat at the area of engagement with the respective first stop wall 350 and the second stop wall 360 of the ratchet pawl 300. When the first stop wall 350 of the ratchet pawl 300 is engaged with the first sidewall 112 of the recessed housing 110 their respective flat, or substantially flat, sections are in full engagement, or full contact, with one another. Alternatively, when the second stop wall 360 of the ratchet pawl 300 is engaged with the second sidewall 114 of the recessed housing 110 their respective flat, or substantially flat, sections are in full engagement. This full engagement transfers the entire load and stress imparted from the teeth 210 of the ratchet gear 200 through the respective first set of teeth 310 or second set of teeth 320 directly to, and evenly distributed, across the entire first stop wall 350 or second stop wall 360 of the ratchet pawl 300 and into, and evenly distributed onto, the respective first sidewall 112 or second sidewall 114 of the recessed housing 110 and ultimately onto the ratchet head 100, which is further driven by a ratchet handle.

Still referring to FIGS. 3-4, because the substantially flat first stop wall 350 or the substantially flat second stop wall 360 of the ratchet pawl fully engages a respective flat section of the first sidewall 112 or second sidewall 114 of the recessed housing 110, each tooth of the respective first set of teeth 310 or the respective second set of teeth 320 fully engage the respective teeth 210 of the ratchet gear 200 for full engagement therebetween as well. With full engagement between the teeth 210 of the ratchet gear and a respective first set of teeth 310, or second set of teeth, in combination with full engagement between the respective stop walls 350, 360 of the ratchet pawl and respective sidewalls 112, 114 of the recessed housing, no stresses are concentrated at a single or small location on each of these surfaces. Instead, the stresses are distributed across and through the entirety of these respective surfaces. This eliminates having locations on these components, including the ratchet pawl and teeth, that are subject to a point load and potential failure, or fracture.

Figure 5:
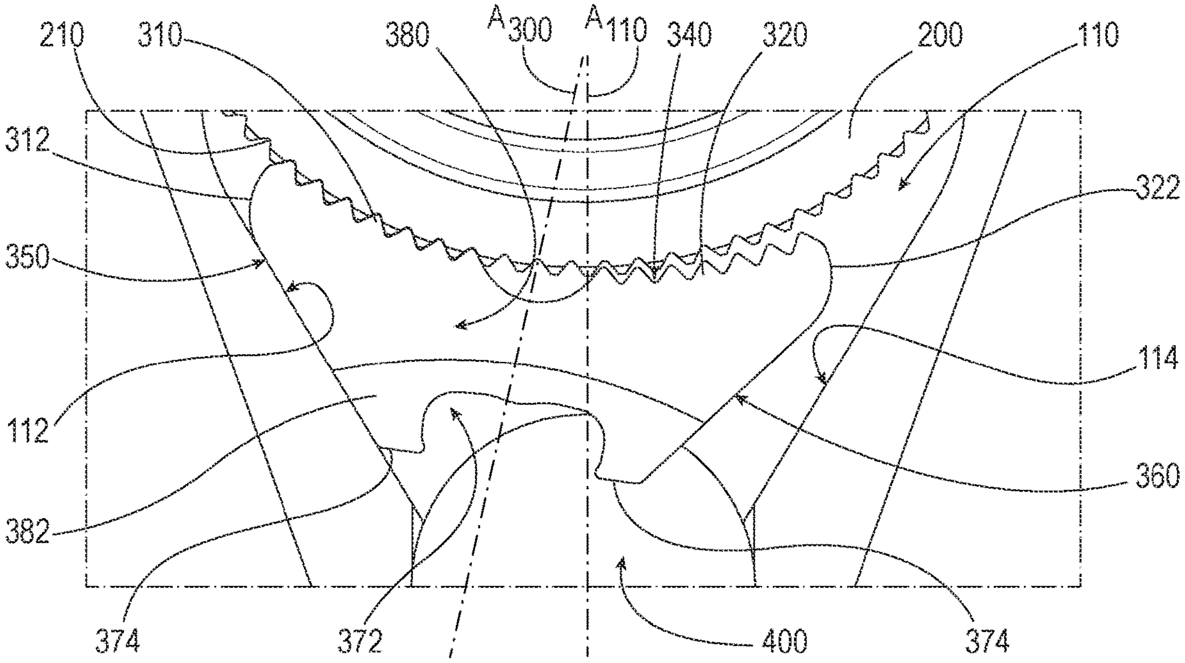
FIG. 5 is a section view of the bottom side of a ratchet head assembly taken at section 5-6 of FIG. 4, in accordance with an example of the disclosure.

Because the ratchet pawl moves within the recessed housing 110 between the respective sidewalls 112, 114 of the recessed housing 110, the angle of the substantially flat first stop wall 350 and the substantially flat second stop wall 360, relative a dividing axis $A_{300}$ (as illustrated by FIG. 5) of the ratchet pawl 300, are different than the angle of the first sidewall 112 and second sidewall 114 of the recessed housing 110, relative a dividing axis $A_{110}$ (as illustrated by FIG. 5) of the recessed housing. In one example, the ratchet pawl 300 travels between the walls of the recessed housing a total of 16 degrees. In other words, there is a difference of 8 degrees between the angles of the substantially flat stop walls 350, 360 of the ratchet pawl 300 and the sidewalls 112, 114 of the recessed housing. In examples, this difference may be between 5 and 10 degrees giving 10 to 20 degrees of travel of the ratchet pawl within the recessed housing 110.

It has been further found that to avoid binding the teeth 210 of the ratchet gear 200, and to support full engagement of each respective set of teeth 310, 320 of the ratchet pawl 300 with the teeth 210 of the ratchet gear 200, a recessed area 330 is provided between the first set of teeth 310 and the second set of teeth 320 of the ratchet pawl 300. The recessed area 330 creates a void which allows the second set of teeth 320 to fully disengage from the teeth 210 of the ratchet gear 200 when the first set of teeth 310 are fully engaged with the teeth 210 of the ratchet gear 200, and vice versa. Otherwise, full engagement between the teeth 210 of the ratchet gear 200 and a respective set of teeth 310, 320 of the ratchet pawl 300 and, accordingly, full engagement between the respective stop walls 350, 360 of the ratchet pawl 300 and the respective sidewalls 112, 114 of the recessed housing 110 may not otherwise be achieved without imparting stresses on teeth that would otherwise be present between the first set of teeth 310 and the second set of teeth 320 in the position of the recessed area 330. This prevents unnecessary loading of the teeth which would, additionally, lead to premature failure of the teeth causing the teeth to become stuck or lodged within the components of the recessed housing 110. This additionally ensures freedom of movement of the ratchet pawl 300 within the recessed housing 110 when transferring between the first set of teeth 310 and a second set of teeth 320. Thereby, it is the combination of having separate sets of teeth 310, 320 on the front face 340 of the ratchet pawl 300 with having substantially flat stop walls 350, 360 that fully engage respective sidewalls 112, 114 of the recessed housing 110 which accomplish the reduction of stress within the mechanism(s) of a ratchet head assembly 10.

The recessed area 330 additionally allows the first set of teeth 310 to be positioned on an entirely different radius than the second set of teeth 320. In one example, the radius the first set of teeth 310 are positioned on, and the radius the second set of teeth 320 are positioned on, may be the same as the radius the teeth 210 of the ratchet gear 200 are positioned on. In a further example, the respective first set of teeth 310 and the second set of teeth 320 of the ratchet pawl, however, may not follow a single arc and may be on different arcs. In view of being on different arcs, the radius of the first set of teeth 310 and the radius of the second set of teeth 320 are mirrored across a dividing centerline of the ratchet pawl 300, or on opposing sides of the recessed area. This further prevents the teeth on the opposite side of the recessed area from engaging while the opposing set of teeth engage at different angles within the mechanism as the ratchet pawl not only moves from sidewall 112 to sidewall 114 but also rotates within the recessed housing in view of having stop walls 350, 360 arranged at different angles than the sidewalls 112, 114, as noted above.

Figure 6:
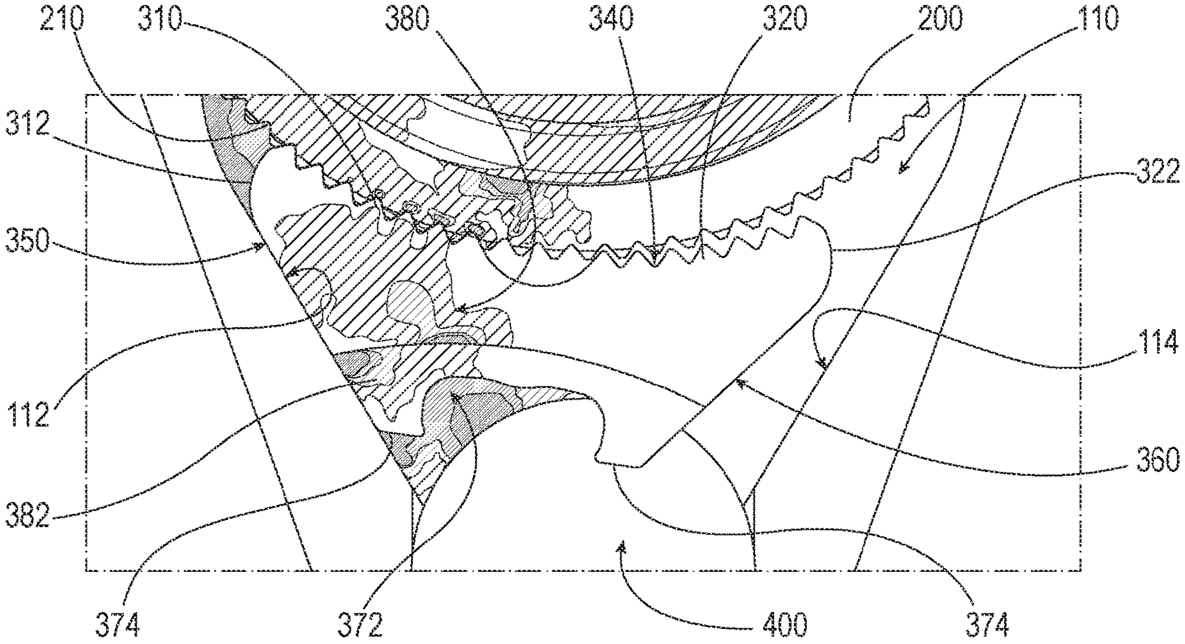
FIG. 6 is a section view of the bottom side of a ratchet head taken at section 5-6 of FIG. 4 and further illustrating the stress on the components of the ratchet assembly, in accordance with an example of the disclosure.
Figure 7:
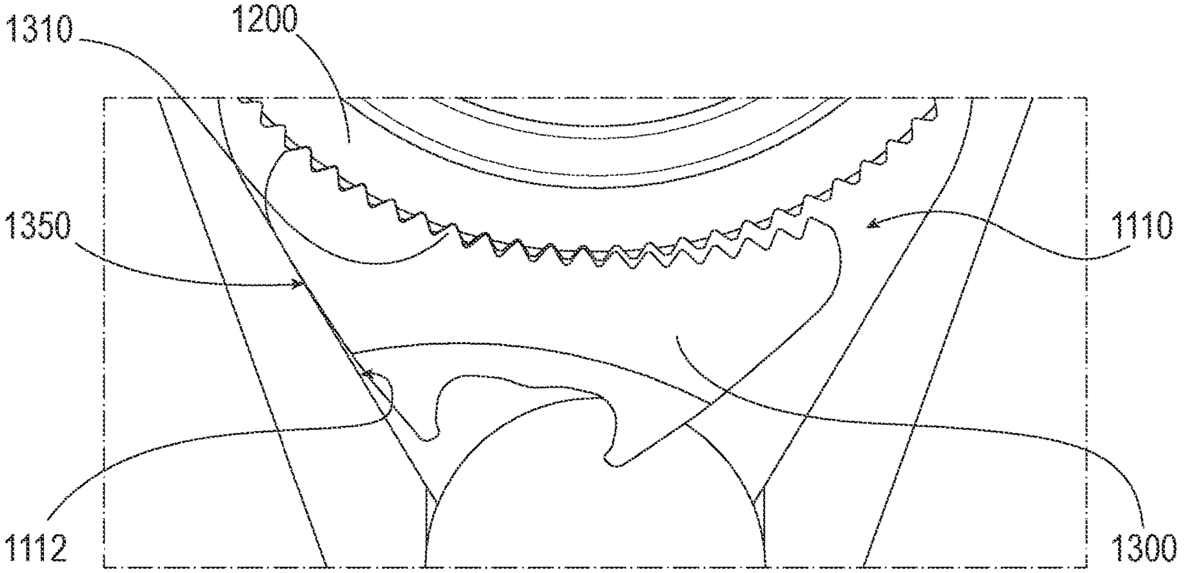
FIG. 7 PRIOR ART
FIG. 7 is a section of a bottom side view of a prior art ratchet head assembly.
Figure 8:
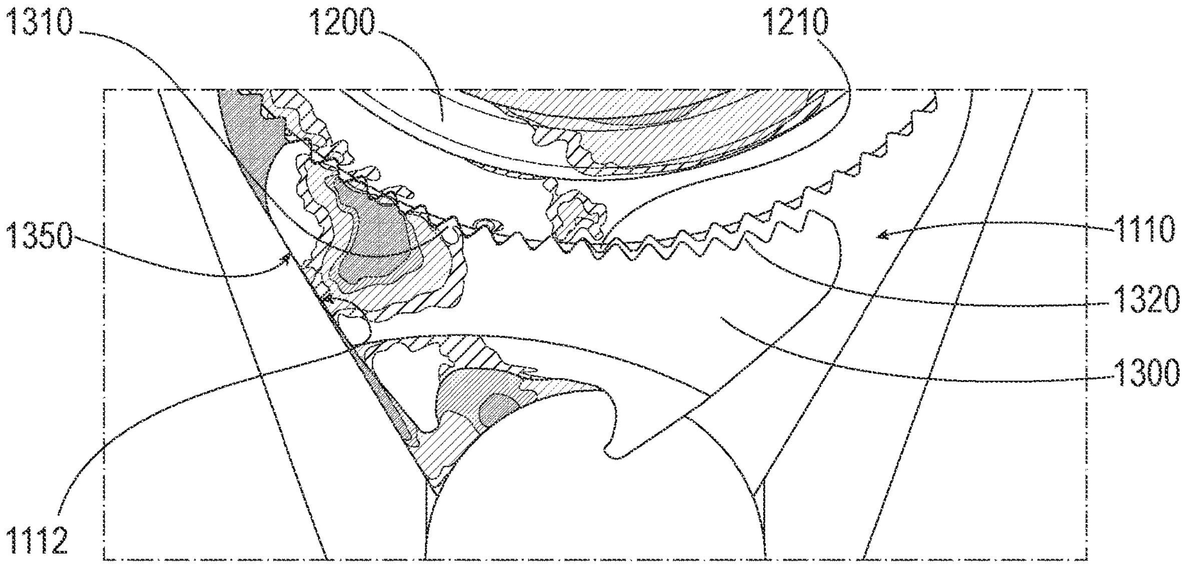
FIG. 8 PRIOR ART
FIG. 8 is a section of a bottom side view of a prior art ratchet head assembly further illustrating the stress on the components of the ratchet head assembly.

This is best illustrated by way of a comparison of FIGS. 5-6 in view of FIGS. 7-8. FIGS. 5-6 illustrate an example of the present disclosure, where the first set of teeth 310 of the ratchet pawl 300 are fully engaged with the teeth 210 of the ratchet gear 200, in combination with the substantially flat first stop wall 350 of the ratchet pawl 300 being fully engaged with the first flat sidewall 112 of the recessed housing 110. FIGS. 5-6 are section views of FIG. 4 taken at section 5-6 of FIG. 4. FIG. 5 illustrates the same features of this section as described above with respect to FIG. 4. FIG. 6 also illustrates the same features of this section as described above with respect to FIG. 4. Further, FIG. 6 illustrates the stress imparted between the ratchet gear 200, the ratchet pawl 300, and the surrounding recessed housing 110. The tighter the hashed lines or shading become in FIG. 6 the greater the stress is in that particular location. As illustrated here, the stress exhibited between the first set of teeth 310 of the ratchet pawl 300 and the substantially flat first stop wall 350 of the ratchet pawl 300 is distributed across this entire section, or half, of the ratchet pawl 300. Further there is no binding between the second set of teeth 320 of the ratchet pawl 300 and the teeth 210 of the ratchet gear 200. In fact, no stresses are exhibited on this opposite side, or half, of the ratchet pawl 300.

FIGS. 7-8 illustrate an image of a prior art design, taken at a similar location within a ratchet head 100 as that taken of the present examples of FIGS. 5-6. The prior art design is absent a substantially flat sidewall and a recessed area between sets of teeth in the ratchet pawl of the present disclosure as set forth above. Instead of having a substantially flat sidewall, the first stop wall 1350 of the ratchet pawl 1300 of FIGS. 7-8 possess a curvature that does not evenly mate with, or fully engage, a first sidewall 1112 of the recessed housing 1110. This has the effect of isolating and centralizing the stresses passing through the ratchet pawl 1300 of FIGS. 7-8 to a smaller section of the ratchet pawl 1300. Moreover, this also has the effect of applying these stresses to a narrowing section of the ratchet pawl 1300 as opposed to distributing the stresses across the entire half of the pawl 1300 or onto the ratchet gear 1200, as was illustrated by the example of the present disclosure in FIG. 6. This isolated and centralized stress location imparts an increase in the load of the stress onto the pawl 1300, as illustrated by the tighter hashed lines. The isolated and centralized stresses illustrated by FIG. 6 ultimately resulted in a premature failure/fracture of the ratchet pawl at across the ratchet pawl 1300. In contrast, the stresses imparted on the example of FIG. 6 did not fail or fracture. Also, the image of FIG. 8 illustrates a stress location extending to the surface of the teeth 1210 of the ratchet gear 1200 where the recessed area would otherwise be positioned in the example of FIGS. 5-6 of the present disclosure. This is the weakest location of the gear teeth. Similar stresses are not present in FIG. 6. This further illustrates an incompatibility between the teeth 1310, 1320 of the ratchet pawl 1300 and the first stop wall 1350 of the ratchet pawl 1300, further illustrating the importance of the combination of these features for the purpose of reducing and redistributing the stress through the arrangement of the features of the ratchet head. Moreover, this additionally illustrates the ratchet pawl of the present disclosure increases the surface area of material by providing a substantially flat sidewall in comparison to curved sidewalls, thereby, further increasing the strength of the mechanism.

Figure 9:
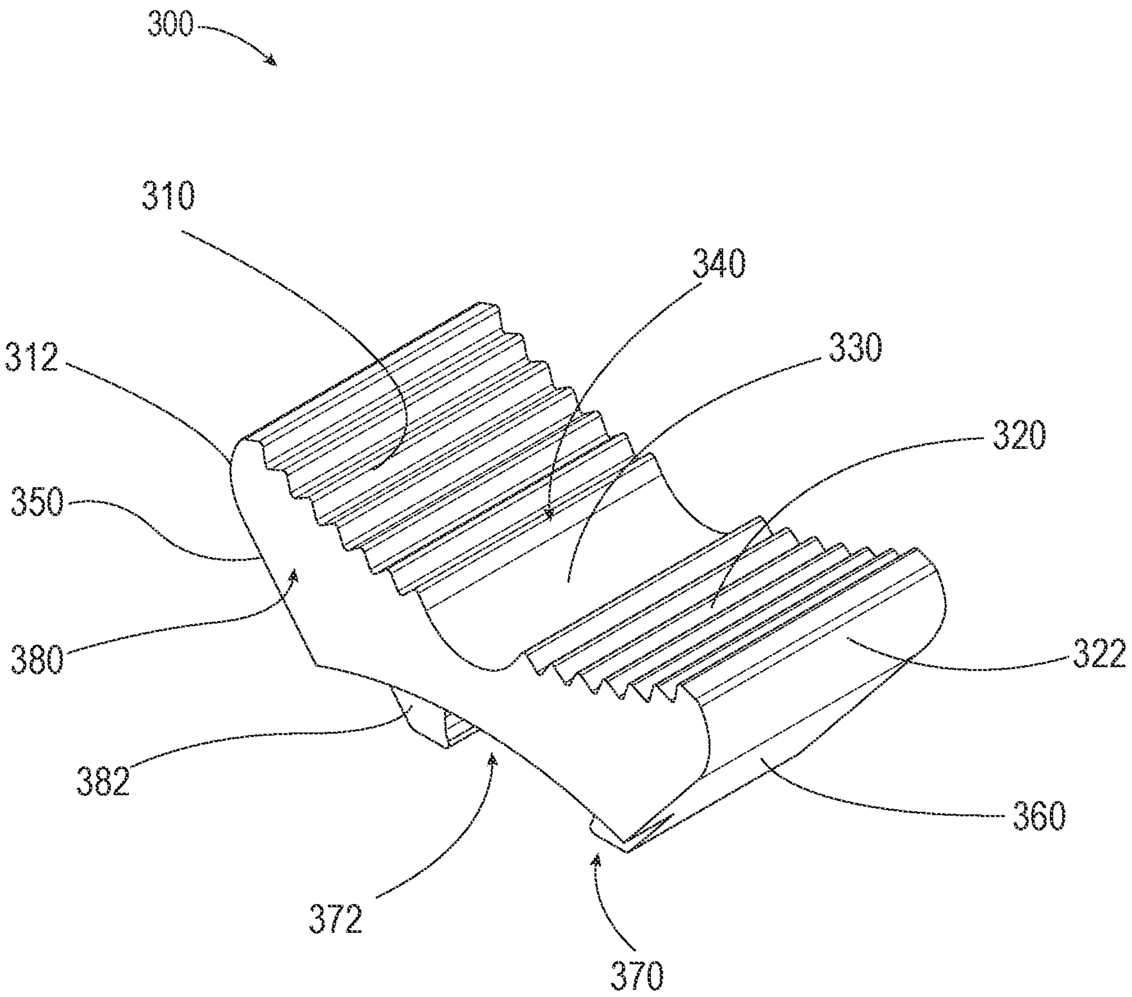
FIG. 9 is a front perspective view of a ratchet pawl, in accordance with an example of the disclosure.

Turning now to FIGS. 9-13, various views of the ratchet pawl 300 of the present disclosure are illustrated. In FIG. 9 a front side perspective view of the ratchet pawl 300 illustrates the first set of teeth 310 and the second set of teeth 320 on the front face 340 of the ratchet pawl 300 with a recessed area 330 therebetween. The seating portion 382 formed in the bottom side 380 of the ratchet pawl 300 is also illustrated with a recess 372 extending into the back face 370 of the ratchet pawl 300. The substantially flat second stop wall 360 and corresponding radiused corner transition 322 is also illustrated. Opposite the substantially flat second stop wall 360 is the substantially flat first stop wall 350 and corresponding radiused corner transition 312.

Figure 10:
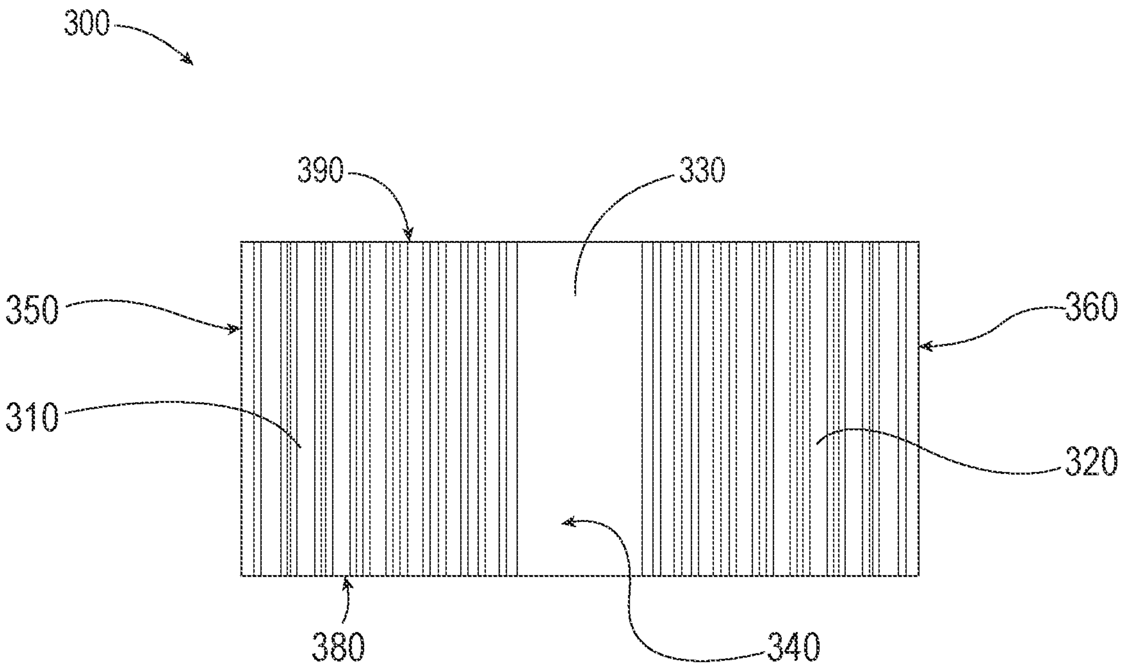
FIG. 10 is a front view of a ratchet pawl, in accordance with an example of the disclosure.
Figure 11:
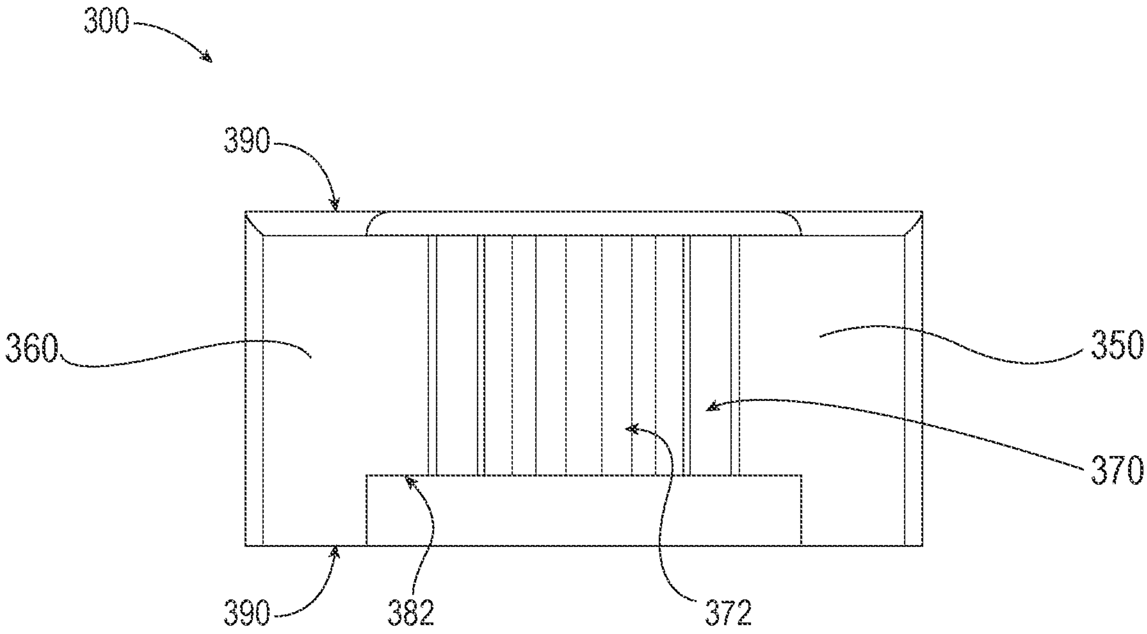
FIG. 11 is a back view of a ratchet pawl, in accordance with an example of the disclosure.

FIG. 10 is a front side view of the ratchet pawl 300 with the top side 390 and bottom side 380 of the ratchet pawl 300 illustrated. The first set of teeth 310 on the front face 340 of the ratchet pawl 300 is separated from the second set of teeth 320 on the ratchet pawl 300 by way of the recessed area 330. FIG. 11 illustrates a back side, or back face 370, view of the ratchet pawl with the top side 390 and the bottom side 380 additionally illustrated. The seating portion 382 is formed in the bottom side 380 of the ratchet pawl 300 with the recess 372 extending into the back face 370 of the ratchet pawl 300.

Figure 12:
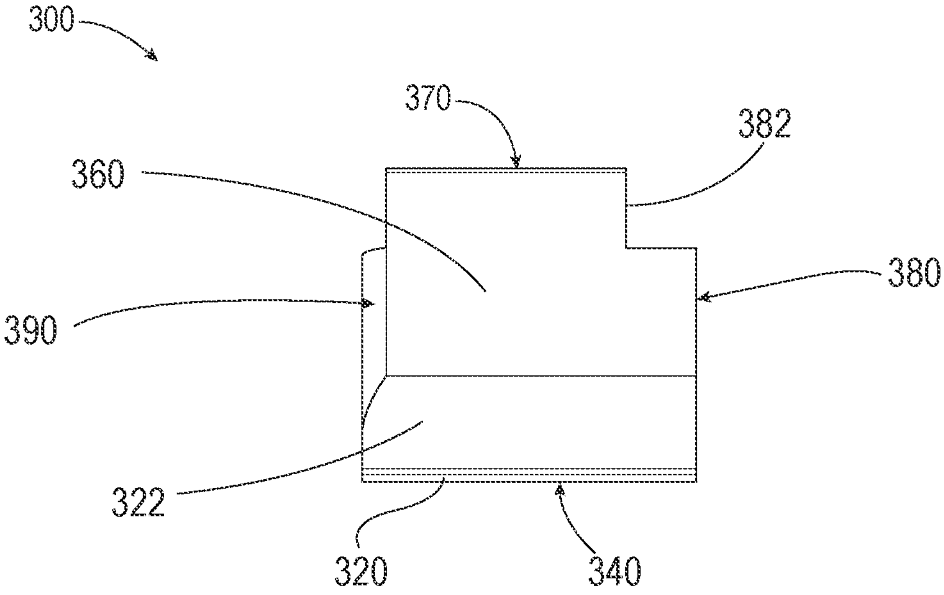
FIG. 12 is a side view of a ratchet pawl, in accordance with an example of the disclosure.
Figure 13:
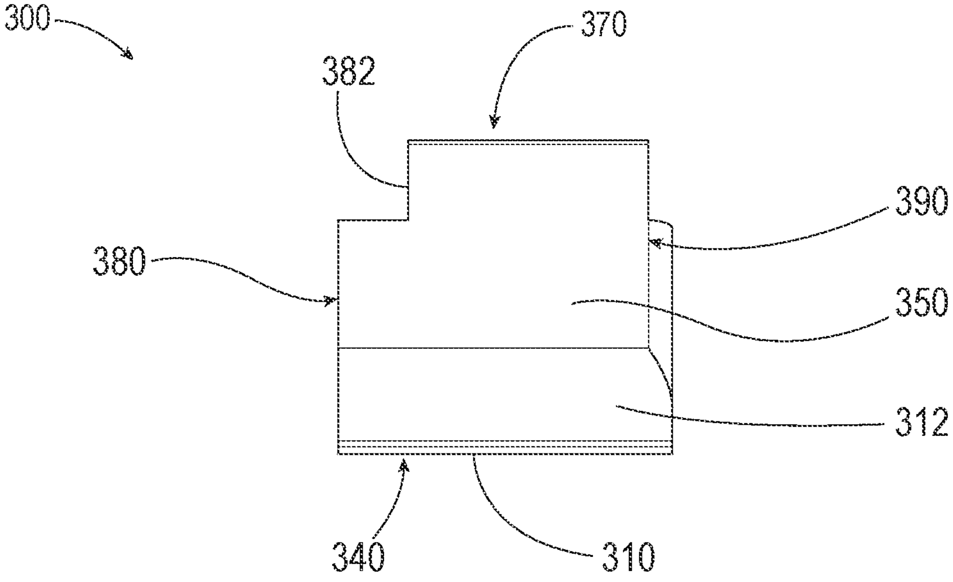
FIG. 13 is a side view of a ratchet pawl, in accordance with an example of the disclosure.

Finally, FIGS. 12-13 illustrate respective side views of the ratchet pawl 300 with the top side 390 and bottom side 380 illustrated. FIG. 12 illustrates the substantially flat second stop wall 360 and corresponding radiused corner transition 322 into the second set of teeth 320. FIG. 13 illustrates the substantially flat first stop wall 350 and corresponding radiused corner transition 312 into the first set of teeth 310.

Figure 14:
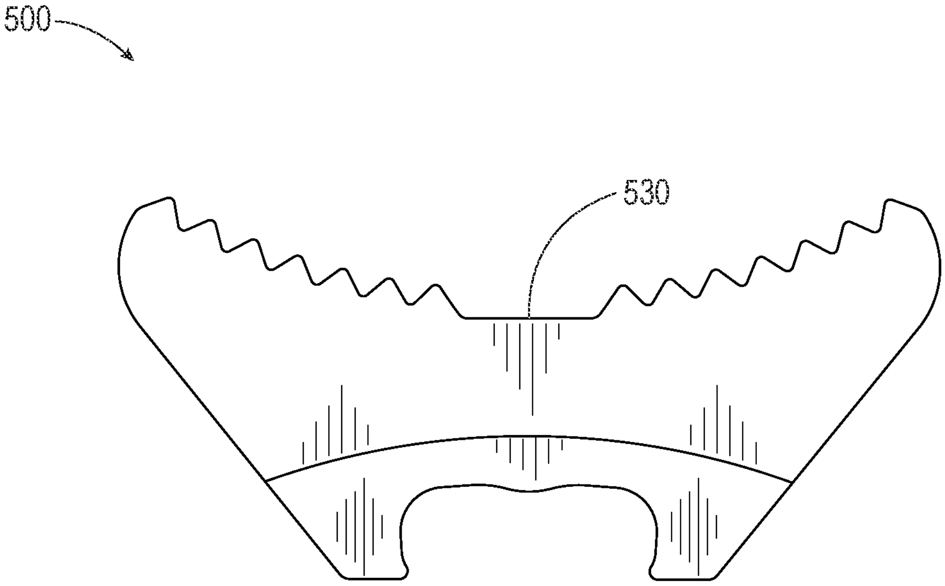
FIG. 14 is a top view of a ratchet pawl, in accordance with an example of the disclosure.

FIG. 14 illustrates yet another example of a ratchet pawl 500 of the present disclosure. The ratchet pawl 500 of FIG. 14 illustrates another arrangement of the recessed area 530, wherein the recessed area 530 is recessed with a straight backwall, or forms a rectangular recess.

Figure 15:
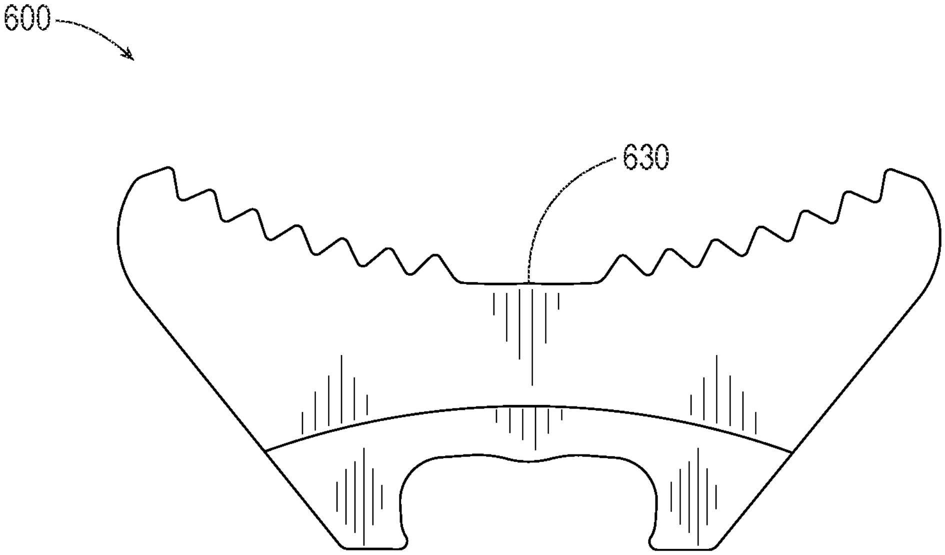
FIG. 15 is a top view of a ratchet pawl, in accordance with an example of the disclosure.

FIG. 15 illustrates yet another example of a ratchet pawl 600 of the present disclosure. The ratchet pawl 600 of FIG. 15 illustrates another arrangement of the recessed area 630, wherein the recessed area 630 is recessed with a backwall that follows an outside diameter of a corresponding ratchet gear (such as, for example, the ratchet gear 200, as illustrated by FIGS. 1 and 3-6).

While this invention has been described with reference to examples thereof, it shall be understood that such description is by way of illustration only and should not be construed as limiting the scope of the claimed examples. Accordingly, the scope and content of the examples are to be defined only by the terms of the following claims. Furthermore, it is understood that the features of any example discussed herein may be combined with one or more features of any one or more examples otherwise discussed or contemplated herein unless otherwise stated.

What is claimed is:

1. A ratchet head comprising:

a recessed housing comprising a ratchet gear engaged with a ratchet pawl where gear teeth of the ratchet gear fully engage a first set of teeth of the ratchet pawl simultaneously with a substantially flat first stop wall of the ratchet pawl fully contacting a first flat sidewall of the housing while a second set of teeth of the ratchet pawl, separated from the first set of teeth of the ratchet pawl by a recessed area, is fully disengaged from the gear teeth of the ratchet gear and a substantially flat second stop wall of the ratchet pawl is fully disconnected from a second flat sidewall of the housing and a length of the substantially flat second stop wall extends into and overlaps a lever;

where a position of the ratchet pawl within the housing is configured to change within the housing and relative to the gear teeth by way of the lever extending into the housing;

where movement of the lever is limited by engagement of the entire substantially flat first stop wall of the ratchet pawl with the first flat sidewall of the housing when the substantially flat first stop wall of the ratchet pawl is fully contacting a first flat sidewall of the housing, the substantially flat second stop wall of the ratchet pawl is fully disconnected from the second flat sidewall of the housing, and the length of the substantially flat second stop wall extends into and overlaps the lever; and where the movement of the lever is additionally limited by engagement of the entire substantial flat second stop wall of the ratchet pawl with the second flat sidewall of the housing when the substantially flat second stop wall is fully contacting a second flat sidewall of the housing, the substantially flat first stop wall of the ratchet pawl is fully disconnected from the first flat sidewall of the housing, and a length of the substantially flat first stop wall extends into and overlaps the lever.

2. The ratchet head of claim 1, where the substantially flat first stop wall is at an acute angle relative the substantially flat second stop wall.

3. The ratchet head of claim 1, where the first flat sidewall of the housing is at an acute angle relative the second flat sidewall of the housing.

4. The ratchet head of claim 1, where an angle between the substantially flat first stop wall and the substantially flat second stop wall is less than an angle between the first flat sidewall of the housing and the second flat sidewall of the housing.

5. The ratchet head of claim 4, where the angle between the substantially flat first stop wall and the substantially flat second stop wall is within 10 to 20 degrees of the angle between the first flat sidewall of the housing and the second flat sidewall of the housing.

6. The ratchet head of claim 1, where the recessed area is concave and forms a third arc between the concave surface of the first set of teeth and the concave surface of the second set of teeth.

7. The ratchet head of claim 1, where the recessed area extends further into the ratchet pawl than the gear teeth of the ratchet gear.

8. The ratchet head of claim 1, where the bottom of the recessed area is spaced from the gear teeth.

9. The ratchet head of claim 1, where rotational stress on the ratchet gear transfers from the gear teeth to the first flat interior sidewall by way of the ratchet pawl from each tooth of the first set of teeth through the entire length of the substantially flat first stop wall.

10. The ratchet head of claim 1, where the ratchet pawl transfers between the first flat sidewall of the housing and the second flat sidewall of the housing and additionally rotates within the housing when transferring.

11. A ratchet head comprising:

a recessed housing comprising a ratchet gear engaged with a ratchet pawl therein, the ratchet gear having gear teeth about a perimeter and a drive body for engaging and rotating a workpiece;

the ratchet pawl having a concave face for engaging the ratchet gear where the concave face comprises a first set of teeth and a second set of teeth separated by a recessed area, the ratchet pawl additionally comprising a first stop wall and a second stop wall extending from adjacent the first set of teeth and the second set of teeth, respectively, in a direction away from the ratchet gear;

an entire length of the first stop wall of the ratchet pawl engages a first sidewall of the recessed housing as all teeth of the first set of teeth fully engage the gear teeth and the second set of teeth are fully disengaged from the gear teeth and a length of the second stop wall of the ratchet pawl extends into and overlaps a lever;

where a position of the ratchet pawl within the housing is configured to change within the housing and relative to the gear teeth by way of the lever extending into the housing;

where movement of the lever is limited by engagement of the entire first stop wall of the ratchet pawl with the first sidewall of the housing when the first stop wall of the ratchet pawl is fully contacting a first sidewall of the housing, the second stop wall of the ratchet pawl is fully disconnected from the second sidewall of the housing, and the length of the second stop wall extends into and overlaps the lever; and where the movement of the lever is additionally limited by engagement of the entire second stop wall of the ratchet pawl with the second flat sidewall of the housing when the second stop wall of the ratchet pawl is fully contacting the second sidewall of the housing, the first stop wall of the ratchet pawl is fully disconnected from the first sidewall of the housing, and a length of the first stop wall extends into and overlaps the lever.

12. The ratchet head of claim 11, where the first stop wall is substantially flat and the second stop wall is substantially flat.

13. The ratchet head of claim 11, where the first stop wall of the ratchet pawl and the first sidewall of the recessed housing are opposing mating surfaces and the second stop wall of the ratchet pawl and a second sidewall are opposing mating surfaces.

14. The ratchet head of claim 11, where the recessed area is centrally positioned on and recessed into a front face of the ratchet pawl.

15. The ratchet head of claim 1, wherein the first set of teeth and the second set of teeth of the ratchet pawl extend across separate respective concave surfaces, each comprising the same radius as a radius of the ratchet gear with the gear teeth, opposite the ratchet gear, where the respective concave surfaces of the first set of teeth and the second set of teeth of the ratchet pawl are on different oriented arcs to support the first set of teeth being fully engaged with the gear teeth of the ratchet gear while the second set of teeth are fully disengaged from the gear teeth of the ratchet gear.

16. The ratchet head of claim 11, wherein the first set of teeth and the second set of teeth of the ratchet pawl extend across separate respective concave surfaces, each comprising the same radius as a radius of the ratchet gear with the gear teeth, opposite the ratchet gear, where the separate respective concave surfaces of the first set of teeth and the second set of teeth of the ratchet pawl are on different oriented arcs to support having the first set of teeth fully engaged with the gear teeth of the ratchet gear while the second set of teeth are fully disengaged from the gear teeth of the ratchet gear.

17. The ratchet head of claim 1, where a width of the substantially flat first stop wall of the ratchet pawl varies.

* * * * *